March 19, 1940.  W. L. TIBBALS  2,194,103
SPRING FRAME CONSTRUCTION
Filed May 31, 1938
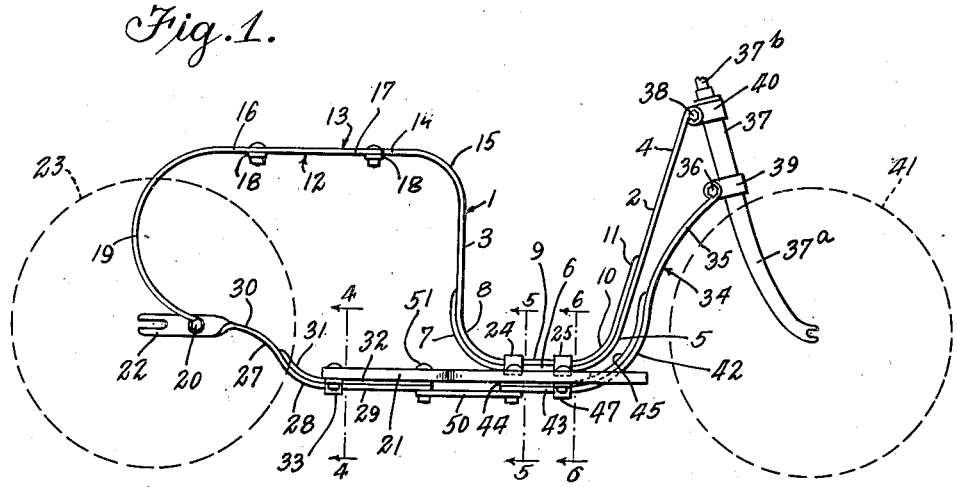
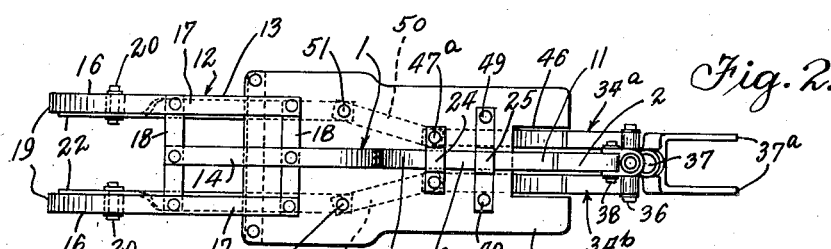
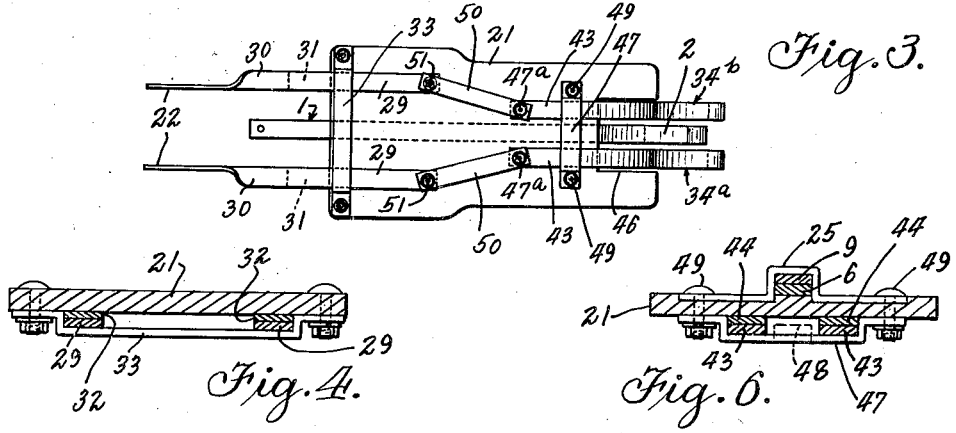
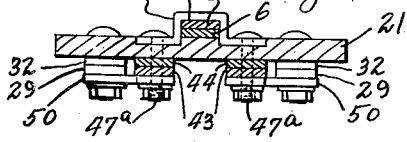
Inventor
William L. Tibbals
By Lyon & Lyon
Attorneys Patented Mar. 19, 1940

2,194,103

UNITED STATES PATENT OFFICE 2,194,103

SPRING FRAME CONSTRUCTION

William L. Tibbals, Los Angeles, Calif., assignor to United States Spring & Bumper Co., Los Angeles, Calif., a corporation of California Application May 31, 1938, Serial No. 210,829

4 Claims. (Cl. 280—283)

This invention relates to the construction of a resilient frame or spring frame intended to be used as a frame, or as part of a frame of vehicles such as automobiles, motorcycles, bicycles, etc.

An object of the invention is to provide a frame, which will be of simple construction, and which will be highly resilient and absorb road shocks so as to give a very easy riding effect for persons carried by the vehicle.

A further object of the invention is to form a frame of this kind, which will be of a type referred to as a "drop frame," that is to say, the middle portion of the frame is at a relatively low elevation. This feature particularly adapts the frame for use in certain types of motorcycles and bicycles, particularly of a type to be used by women, and avoiding the substantially horizontal upper bar used in bicycle frames ridden by men.

While the invention may be applied in the construction of the frames of any kind of vehicles, in the present specification the invention is described as applied to a frame for a new type of vehicle, which is usually called a "motor scooter"; that is to say, a vehicle having a spring frame which is propelled by the motor.

One of the objects of the invention is to construct the frame so that it will have considerable resiliency while presenting an elevated spring-supported seat for the rider; it will also provide a substantially rigid support or base plate for the motor forward of, or associated with, the rear wheel of the vehicle which is driven by the motor.

In the preferred construction of the invention as applied to the motorcycle type of frame, the frame presents two forwardly projecting tongues, the forward ends of which are attached to the rigid head fitting in which the steering fork turns, and one of the objects of the invention is to provide a spring construction for supporting this fork, which will enable the steering fork to have an up or down movement relative to the rear portion of the frame without substantially altering the angular position of the longitudinal axis of the steering fork. In other words, to provide a construction at the forward end that will give a substantially "parallel movement" to the steering fork as it moves up and down relatively to the frame, due to unevenness of the roadway.

The invention is characterized by the liberal use of bows in springs, organized together in such a way that the seat carrying the rider, is supported on a plurality of bows adjacent to the seat, all of which contribute to ease of riding, and the support for these bows toward the forward end of the vehicle, rides on other bow springs so that the general effect is to produce an extremely easy riding vehicle.

A further object of the invention is to provide an improved organization of spring frame members connected to a substantially horizontal rigid member, or running-board, a portion of which serves admirably as a foot-rest for the rider, and the rear portion of which serves as a support for a motor carried by the vehicle.

Further objects of the invention will appear hereinafter.

The invention consists in the novel parts and combination of parts to be described hereinafter, all of which contribute to produce an efficient spring frame construction.

A preferred embodiment of the invention is described in the following specification, while the broad scope of the invention is pointed out in the appended claims.

In the drawing:

Fig. 1 is a side elevation of a spring frame construction embodying my invention and illustrating the invention as applied to a motor-driven bicycle, and in this view the outlines of the wheels of the vehicle are shown in dotted lines.

Fig. 2 is a top plan view of the structure illustrated in Fig. 1.

Fig. 3 is a bottom plan view of the spring frame exclusively, and omitting the steering fork, and also omitting some cross bars that are employed in forming the support for the rider's seat.

Fig. 4 is a vertical section upon an enlarged scale taken on the line 4—4 and looking toward the rear passing through the running-board, but this view merely shows the cross-section and does not illustrate any part located beyond the plane of the cross-section except those immediately connected with the running-board.

Fig. 5 is a view similar to Fig. 4, but taken in the plane of the line 5—5 of Fig. 1. This view also omits a number of parts located to the rear of the plane in which the section is taken. This view particularly illustrates the relation of the upper and lower spring members and the means for rigidly securing the same.

Fig. 6 is a view similar to Fig. 5, and is a section taken on the line 6—6 of Fig. 1. This view also omits many parts to the rear of the point where the section is taken.

Before proceeding to a more detailed description of the invention, it should be stated that in practicing the invention, I prefer to employ at the front an upper spring and a lower spring. These springs involve the use of bows employed at their rear or lower ends, which are rigidly secured with respect to each other. These springs present tongues projecting forwardly, or forwardly and upwardly, as indicated in Fig. 1; and the forward ends of these tongues are attached to a rigid frame member which, in the present instance, is the head fitting in which the steering fork turns. The rear portion of the frame forms a loop with a substantially horizontal upper extension with which parts cooperate to form a seat support. And this horizontal extension is supported on a rear bow and on forward bows located at about the middle of the vehicle frame. The upper spring forwardly is preferably formed of two separate spring members displaced laterally from each other so that the lower spring member is located in a vertical plane between the same. The upper section of the complete frame preferably comprises a forward section and a rear section, and these two sections are bent into bows with shanks between them. These shanks overlie each other and are secured together, and to a fixed part such as the running-board or rigid member of the frame. In this way the rear bow of the forward section reinforces the rear portion of the spring, and the forward portion of the rear piece reinforces the forward section of the spring.

Referring to the parts illustrated, 1 indicates the upper spring frame which preferably includes the forward section 2 and a rear section 3. The forward section 2 includes a substantially straight tongue 4 that extends forwardly, and in the present instance, extends forwardly and upwardly; and this tongue extends outwardly from a forward bow 5, which is connected by a substantially horizontal shank or bar 6 to a rear bow 7. These bows 5 and 7 have their convex side disposed downwardly. The rear spring section 3 is formed with a bow 8 to nest against the convex face of the bow 7, and forward of the bow 8 is formed with a substantially straight shank 9 forward of which the spring is formed into a bow 10 that nests against a concave side of the bow 5, and forwardly of the bow 10 a substantially straight shank 11 may be formed on this spring that lies against the upper or rear face of the tongue 4.

The spring sections 2 and 3 are preferably located in the central vertical plane of the vehicle in the case of a motor bicycle. The rear portion of the construction involves a rear spring frame 12, which is preferably in the form of a loop including a substantially horizontal portion 13 that operates as a support for the seat of the rider, as will be described hereinafter. This portion of the frame is preferably formed by providing the spring member 3 with a substantially horizontal elevated extension or rear tongue 14 that is connected by a bow 15 with a substantially vertical extension of the part 3 that connects with the bow 8.

The rear spring frame also preferably includes two side springs 16 (see Fig. 2) which have horizontal upper extensions or tongues 17 located at the same level as the tongue 14, and preferably connected to the same by cross bars 18 fastened to the same so as to form a substantially rectangular seat frame. At the rear the spring members 16 are bent around on a large radius to form bows 19, and the lower ends of these bows are preferably attached by shackles or pivot pins 20 to the rear end of the relatively rigid member 21, the rear end of which has an extension 22 to carry the shaft of the rear wheel indicated by the dotted lines 23.

In accordance with my invention, the shanks 9 and 6 of the spring members 2 and 3, are preferably securely attached, and they are also preferably secured to the rigid substantially horizontal member 21. In the present instance this member 21 is in the form of a board or plate to which cleats 24 and 25 are secured, preferably as shown in Figs. 5 and 6. The bodies of these cleats are offset upwardly to form substantially rectangular sockets 26 to receive and hold the shanks together, and at the same time to secure the same against the upper face of the running-board 21.

Referring again to the rear end of the frame, the rear end of the running-board 21 is provided with a rearwardly extending lower bar 27, the forward portion of which is bent to form a bow 28 to the rear of the shank 29 of this member, which shank is secured to the under side of the running-board 21, as will be described hereinafter. This bow 28, however, only extends through a few degrees of curvature, and to the rear of it this bar 27 is bent to a slight curve or bow 30 in the opposite direction, and beyond this bow 30 the flat bar is twisted so that the flat face is in a substantially vertical plane to form the rearwardly extending part 22.

The bow 28 is preferably reinforced on its upper side by a spring bow 31, which forms the rear end of the upper bar, the shank 32 of which overlies the shank 29 and is bolted with the same by means of a cleat 33 to the under side of the running-board 21.

At the forward end of the construction, I provide an under spring or lower spring 34, which spring is preferably a double spring comprising a left-hand section 34a (see Fig. 2) and a right-hand section 34b. The forward end of each of these spring sections 34b, 34a forms a tongue 35, and these tongues are pivotally secured on a pivot pin 36 to a rigid frame member of this structure. In the present instance, this rigid frame member is the head fitting 37 carrying steering fork 37a of the bicycle. A similar but shorter pivot bolt 38 connects the forward end of the tongue 4 to the head fitting 37 carrying steering fork 37. The structure of this steering fork comprises a metal sleeve with enlarged heads or collars 39 and 40 at its ends, to which the lower springs and the upper spring are respectively attached, and the stem 37b of the fork 37a, of course, rotates freely in the head fitting when steering. The forward end of the fork carries the forward wheel indicated by the dotted lines 41.

Each spring member 34a or 34b is bent adjacent the forward end of the running-board 21, so as to form a bow 42 with its convex side downwardly, and behind this bow each spring member is formed into a shank 43 underlying the running-board, and at this point both of these spring members are preferably reinforced by providing a short spring having a shank 44 that overlies the shank 43 and provided with a bow 45 that extends forwardly and nests against the concave face of the bow 42. This bow 45 materially reinforces the spring members 34a and 34b when they flex upwardly.

In order to accommodate the spring members 34a and 34b, the forward end of the running-board is preferably formed with a large clearance notch 46 (see Fig. 2).

The bolts 47a that secure the cleat 24, preferably extend down through two bolt holes through the rear ends of the shanks 43 and 44 so that these parts are all tied together. As these bolts prevent lateral movement of the rear ends of the shanks 43 and 44, it is not necessary to offset the body of a clip 47 (see Fig. 6) that secures these shanks together. However, if desired, the body of this clip can be offset upwardly against the under face of the running-board 21, as indicated by the dotted lines 48 in Fig. 6. This would form a socket to prevent any lateral movement of the reinforcing spring 45 at its shank 44. This clip 47 and the upper clip 25, can be secured by the same bolts 49 if desired, as illustrated in Fig. 6.

In order to relieve the running-board 21 of internal stresses due to the fact that the springs 34a and 34b are out of alignment with the rear spring bows 28 and 31, I may provide inclined links 50 (see Fig. 3) the forward ends of which attach to the bolts 47a and the rear ends of which attach to bolts 51 that pass through the forward ends of the overlying shanks 29 and 32 of the spring members 28 and 31.

By reason of the fact that the point of connection of the lower spring members 34a and 34b to the rigid member 21 is considerably below the point of connection for the upper spring member 2, it will be evident that when these forward spring members flex up or down, the bolts 36 and 38 will move along lines substantially parallel to each other. This will tend to keep the axis of the steering fork 37a substantially parallel to its normal position.

The loop 12 formed by the rear portion of the spring frame, provides an open space facilitating the placement of a motor supported on the rear portion of the running-board 21, which is in a position to enable it to be connected up to the axle of the rear wheel 23 for driving it.

While the frame construction described is particularly adapted to be used on a motor bicycle, it is obvious that a light automobile frame could be formed by using two springs having the general structure illustrated in Fig. 1, located at opposite sides of the automobile. In other words, by employing two such frames connected rigidly by cross bars, a light serviceable frame could be constructed adapted to run on four wheels instead of two.

It is understood that the embodiment of the invention described herein is only one of the many embodiments this invention may take, and I do not wish to be limited in the practice of the invention, nor in the claims, to the particular embodiment set forth.

What I claim is:

1. In a vehicle spring construction, the combination of a substantially rigid horizontal frame member, an upper spring having a substantially horizontal bar with means for securing the same to the rigid member, said upper spring having a forward bow with its convex side located downwardly, and having an upwardly extending forward tongue; and a lower spring having a substantially horizontal bar attached to the under side of said rigid member, and having a forwardly disposed bow with its convex side downward, and with an upwardly extending forward tongue extending from said last named bow, and resilient means having a flat steel spring with its front side substantially horizontal, connecting the rear end of said first bar with the rear end of said rigid member and capable of flexing freely in a vertical plane.

2. In a vehicle spring construction, the combination of a substantially rigid horizontal frame member, an upper spring having a substantially horizontal bar with means for securing the same to the rigid member, said upper spring having a forward bow with its convex side located downwardly, and having an upwardly extending forward tongue; and a lower spring having a substantially horizontal bar attached to the under side of said rigid member, and having a forwardly disposed flat steel bow with its convex side downward, and with an upwardly extending forward tongue extending from said last named bow, and a resilient frame connecting the rear end of the first bar with the rear end of said rigid member, said resilient frame having a flexible bow at its rear end and an upper substantially horizontal extension to operate as a seat support.

3. In a spring frame construction for a wheeled vehicle, the combination of a substantially horizontal rigid frame member, an upper spring attached to the upper side of the same having a bow and a forward bow with a forward tongue extending upwardly and forwardly, said upper spring having a rear bow at its rear end; and a pair of lower springs attached to the said rigid frame member, having tongues respectively extending forwardly below the first named tongue and located on each side of the same, said upper spring having a rear spring extension; and a pair of spaced rear springs connected below to said rigid member and having upwardly extending bows with upper extensions, and means connecting the same to the rear extension of the upper spring to form a seat rest.

4. In a spring frame for a motorcycle or bicycle, the combination of a substantially horizontal running board, an upper spring attached to the same with a forward bow having a forwardly extending tongue, a pair of lower springs attached to said rigid member at each side of said upper spring respectively and having forward tongues, means connecting the same to said first named forward tongue, and a rear spring frame connected with the rigid member and having an elevated seat extension, said upper spring having a bow with an elevated seat extension, and means connecting said elevated seat extensions to form a seat rest.

WILLIAM L. TIBBALS.